April 24, 1962 W. KUKUK 3,031,581
DIAPHRAGMS OF PHOTOGRAPHIC OBJECTIVES
Filed July 1, 1959 2 Sheets-Sheet 1

INVENTOR:
Wilhelm Kukuk
BY
Richards & Geier
ATTORNEYS

April 24, 1962  W. KUKUK  3,031,581
DIAPHRAGMS OF PHOTOGRAPHIC OBJECTIVES
Filed July 1, 1959  2 Sheets-Sheet 2

INVENTOR:
Wilhelm Kukuk
BY
Richards Geier
ATTORNEYS

3,031,581
Patented Apr. 24, 1962

3,031,581
DIAPHRAGMS OF PHOTOGRAPHIC
OBJECTIVES
Wilhelm Kukuk, Munich, Germany, assignor to Optische Werke C. A. Steinheil Sohne G.m.b.H., Munich, Germany
Filed July 1, 1959, Ser. No. 824,299
Claims priority, application Germany July 10, 1958
3 Claims. (Cl. 250—237)

This invention relates to diaphragms of photographic objectives and refers more particularly to the arrangement of diaphragms for annular photoelectric cells for photographic objectives having an electrically actuated diaphragm.

It is known in prior art to use moving coil galvanometers for the setting of a diaphragm of a photographic objective, whereby the galvanometers receive their current from a photoelectric cell which may be located in the front part of the objective. These photoelectric cells are usually ring-shaped and surround the lenses of the objective. In such devices, the operation of the diaphragm can take place either indirectly or directly by actuating a stop for the diaphragm.

Furthermore, exposure meters are known in prior art wherein exposure factors are determined by the movement of an indicator with the assistance of scale-carrying discs, whereby the film sensitivity is set in advance. It is possible to make selections at will between the diaphragm location and the time of exposure, provided that the luminosity power is preserved. In the case of an objective having an electrically actuated diaphragm, one of these two exposure factors is set automatically, namely, corresponding to the light intensities which strike the photoelectric cell. The determination of the other exposure factor, namely, the time of exposure, can take place in the case of a predetermined desired diaphragm opening only by influencing the amount of light striking the photoelectric cell.

An object of the present invention is the provision of a device of the described type, wherein this amount of light can be regulated and, furthermore, wherein the amount of light is adapted to the sensibility of the film.

Other objects of the present invention will become apparent in the course of the following specification.

The objects of the present invention may be realized in the case of a diaphragm arrangement for annular photoelectric cells for objectives having an electrically actuated diaphragm, by providing a slit in the photoelectric cell or by shaping it as a ring segment. The annular diaphragm is rotatably mounted and is arranged concentrically to the photoelectric cell in such manner that a part of the annular diaphragm located in front of the photoelectric cell will partly cover it, while the remaining portion of the diaphragm is located below the photoelectric cell, whereby the annular diaphragm extends through the slot or opening of the photoelectric cell between the portions of the diaphragm located below and above the cell.

According to an embodiment of the present invention, the slotted or segment-shaped photoelectric cell extends in a single plane, and the annular diaphragm has the shape of the letter S and extends through the slit or opening from the underside of the photoelectric cell to the upper side thereof.

Another embodiment of the present invention constitutes the kinematic reversal of the above described arrangement and therein the photoelectric cell has the form of a spiral or helix, or a part of a helical winding, whereby the annular diaphragm extends along a straight line or a single plane through the slot or the opening of the photoelectric cell. In this construction, the annular diaphragm adapts itself to the helical winding of the photoelectric cell in a manner similar to that of intermeshing screw threads and counterthreads.

According to a further embodiment of the present invention, the setting of the annular diaphragm takes place by means of a setting ring which covers the numerals indicating the duration of the exposure, whereby these numerals appear in openings or windows of another setting ring located over the first-mentioned setting ring and used for setting the specific sensitivities of the various films; the two setting rings are coupled mechanically in such manner that the required screening or covering of the photoelectric cell takes place corresponding to the duration of the exposure which can be read upon a scale and the set sensitivity of the film being used.

The invention will appear more clearly from the following detailed description, when taken in connection with the accompanying drawings showing, by way of example, preferred embodiments of the inventive idea.

Figure 1:
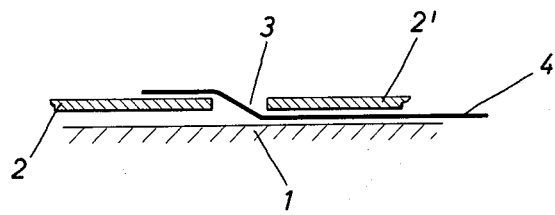
FIGURE 1 is a diagram illustrating in section the arrangement of the diaphragm when used in conjunction with a flat annular photoelectric cell.

FIGURE 1 illustrates diagrammatically an objective casing 1 against which lies a flat annular photoelectric cell having two end portions 2 and 2'. A slit or slot 3 is located between these two end portions and a diaphragm 4, which is also annular in form, extends in the form of the letter S through the slit 3. It is apparent that at the right hand portion of FIGURE 1, the diaphragm 4 extends between the end portion 2' of the photoelectric cell and the objective 1; thereupon the diaphragm 4 extends through the slit 3 from the underside of the photoelectric cell portion 2' to the upper side of the photoelectric cell portion 2. In this construction any suitable means (not shown) are used to move the diaphragm 4 through the slot 3 so as to cover or uncover a smaller or larger section of the end portion 2 of the photoelectric cell.

Figure 2:
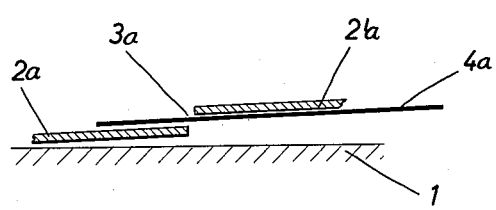
FIGURE 2 is a diagram illustrating in section an annular photoelectric cell having the shape of a helical winding.

FIGURE 2 illustrates diagrammatically the arrangement wherein the annular photoelectric cell has the shape of a helical winding. It is apparent that the portion 2'a of the photoelectric cell is located higher than the other end portion 2a. In this construction, a passage or slot 3a is also formed and the diaphragm 4a extends through the slot 3a. However, it is apparent that in this construction, the diaphragm 4a does not change its form when passing through the passage 3a, so that the diaphragm extends along a straight line or a plane surface. The diaphragm 4a can be rotated by any suitable means (not shown) relatively to the helical photoelectric cell so that it will cover or uncover a larger or smaller portion of the helix.

Figure 3:
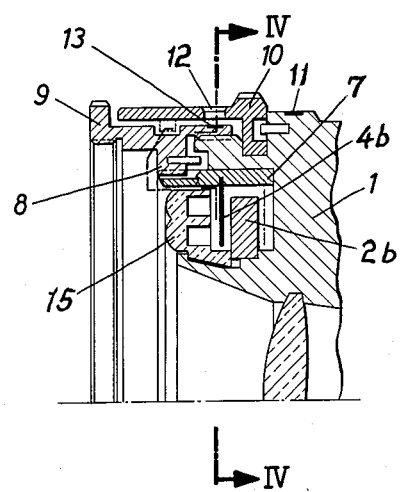
FIGURE 3 shows in longitudinal section a portion of an objective constructed in accordance with the principles of the present invention.
Figure 4:
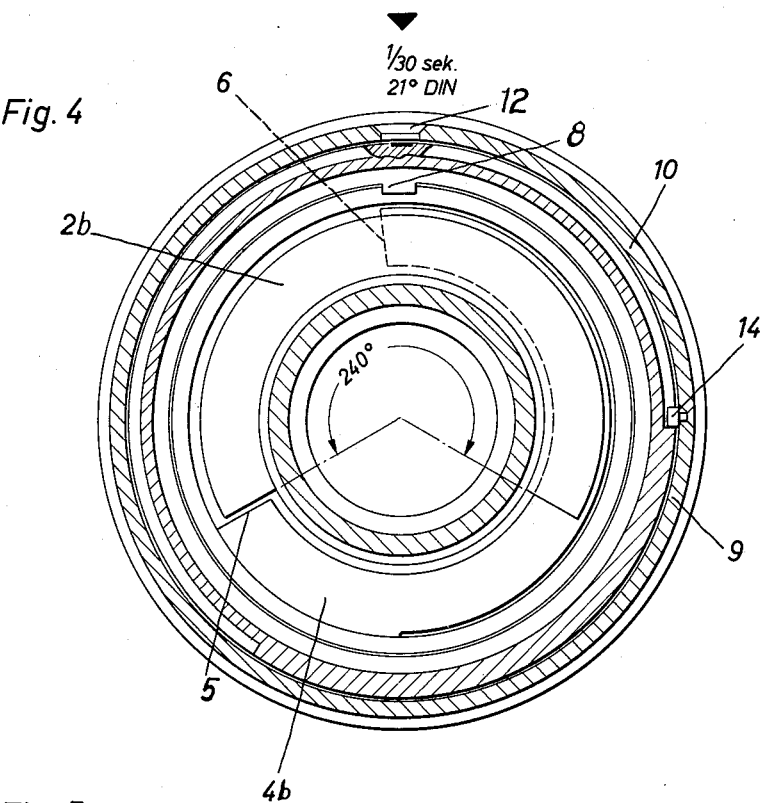
FIGURE 4 is a section along the line IV—IV of FIG. 3.

FIGURES 3 and 4 show an objective casing 1 carrying a photoelectric cell 2b, which has the shape of a ring portion extending to about 240°, for example, and enclosing the axis of the objective. An annular honey comb lens 15 may be located at a distance from the cell. An annular diaphragm 4b has the shape of a portion of an annular disc and is made of a very thin bendable steel sheet.

When the photoelectric cell is not covered, the front edge 5 of the diaphragm 4b is located directly over the light sensitive layer at one end of the photoelectric cell 2b, while the opposite end of the annular diaphragm 4b, which has an edge 6, is located under the photoelectric cell 2b. Due to this shape of the annular diaphragm 4b, it is possible to cover the entire photoelectric cell 2b.

An end portion of the diaphragm 4b is attached to a ring portion 7 which is rotatably connected by a projection 8 with a time setting ring 9. A ring 10 is used to set the sensitivity of the film which is being used in the camera. The setting of the ring 10 takes place in relation to an invariable permanent marking 11.

Figure 5:
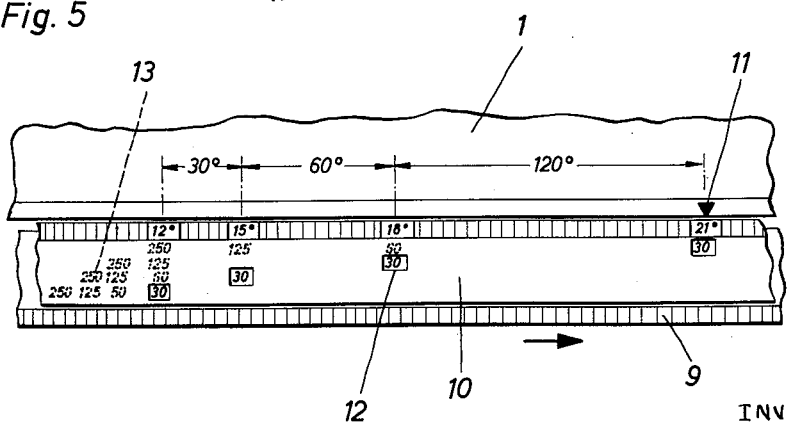
FIGURE 5 is a developed view of a portion of the setting ring provided with the required indicia.

As shown in FIGURE 5, the ring 10 is provided with openings or windows 12 which are located upon the circumference of the ring. Each of these windows corresponds to a certain film sensitivity and through these windows it is possible to read the corresponding durations of exposure. The windows 12 are staggered relatively to each other in the direction of the optical axis, so as to make it possible to properly arrange the time periods of exposure which are carried upon the time setting ring 9 located below the ring 10. Preferably, each time setting scale is made of the same color as the corresponding indication of the film sensitivity.

Since further details of the objective, the measuring device and the diaphragm do not constitute a part of the present invention, they are not illustrated in the drawings.

The operation of this device is as follows:

The operator first sets the film sensitivity by shifting the ring 10 in relation to the immovable marking 11. Then the user sets by means of the ring 9, the desired duration of exposure which is then set upon the shutter. If the user desires to operate with a different duration of exposure, the latter can be set at will by means of the ring 9.

In the example shown in the drawing, the exposure is 1/30 sec. and the sensitivity of the film is 21° DIN (German Industry Norms). In that case, the entire surface of the photoelectrical cell 2b is free.

On the other hand, if the user sets the device at 1/60 sec., then one-half of the light sensitive surface of the photoelectric cell 2b will be covered.

If, by way of example, the user changes the film sensitivity from 21° DIN to 18° DIN, then the pin 14 will move the setting ring 9 and with it the ring portion 7, and thus the photoelectric cell 2b will be covered automatically to the desired extent.

Ball stops which are not shown in the drawings correspond to the individual setting values.

When filters are used, the filter factor will be taken into consideration automatically since in that case, the filter lies in front of the honey comb lens 15.

It may be possible to use an iris diaphragm instead of a ring diaphragm. However, the iris diaphragm requires a larger amount of space and operates unsatisfactorily if that when the diameter of the objective is too large, this is noticeable in an inconvenient way in the finder. Another drawback is that if, for example, the photoelectric cell is covered to 1/64, the remaining ring becomes so narrow that it can be hardly adjusted for practical purposes.

It is also possible to use polarized filters for the covering of the photoelectric cell which can turn relatively to each other. Gray filters or the like can be used also.

It is apparent that the examples shown above have been given solely by way of illustration and not by way of limitation and that they are subject to many variations and modifications within the scope of the present invention. All such variations and modifications are to be included within the scope of the present invention.

What is claimed is:

1. In an electrical device for actuating diaphragms of photographic objectives, the combination of an annular photoelectric cell located in one plane and having a passage formed therein, with an annular rotary diaphragm concentrical to said cell and having a portion adapted to extend over said cell to cover from light-exposure a predetermined portion of said cell, another integral portion extending through said passage and a further integral portion extending below said cell, said diagram being S-shaped in relation to the plane of the cell.

2. In an electrical device for actuating diaphragms of photographic objectives, the combination of a photoelectric cell located in one plane and having the shape of a ring segment, said cell having a passage formed therein with a rotary diaphragm having the shape of a ring segment concentrical to said cell and comprising a portion movable over said cell to cover from light-exposure a predetermined portion of said cell and another portion located below said cell, said diaphragm being S-shaped in relation to the plane of the cell.

3. In an electrical device for actuating diaphragms of photographic objectives, the combination of a photoelectric cell having the shape of a helix with a rotary diaphragm located in one plane and extending through a passage formed between the windings of said helix, said diaphragm having a portion extending over said cell to cover from light-exposure a predetermined portion of said cell and another portion located below said cell.

References Cited in the file of this patent
UNITED STATES PATENTS

| 2,058,531 | Tuttle | Oct. 27, 1936 |
| 2,612,091 | Weiss | Sept. 30, 1952 |
| 2,728,265 | Stimson | Dec. 27, 1955 |

FOREIGN PATENTS

| 502,908 | Great Britain | Mar. 28, 1939 |